(12) United States Patent
Weber et al.

(10) Patent No.: US 7,056,378 B2
(45) Date of Patent: Jun. 6, 2006

(54) METHOD FOR PRODUCING VATTABLE ORGANIC PIGMENTS

(75) Inventors: Joachim Weber, Frankfurt am Main (DE); Manfred Urban, Wiesbaden (DE); Erwin Dietz, Koenigstein (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/511,857

(22) PCT Filed: Mar. 17, 2003

(86) PCT No.: PCT/EP03/02730

§ 371 (c)(1),
(2), (4) Date: Oct. 15, 2004

(87) PCT Pub. No.: WO03/087231

PCT Pub. Date: Oct. 23, 2003

(65) Prior Publication Data

US 2005/0229817 A1    Oct. 20, 2005

(30) Foreign Application Priority Data

Apr. 16, 2002   (DE)   ................. 102 16 681

(51) Int. Cl.
C09B 67/04      (2006.01)
C09B 67/28      (2006.01)
C08K 5/00       (2006.01)

(52) U.S. Cl. .................. 106/493; 106/412; 106/494; 106/495; 106/496; 106/497; 106/498

(58) Field of Classification Search ............. 106/412, 106/493, 494, 495, 496, 497, 498
See application file for complete search history.

(56) References Cited

U.S. PATENT DOCUMENTS

| 2,905,685 | A |   | 10/1959 | Eckert et al. |
| 4,189,582 | A | * | 2/1980  | Hoch et al. ................ 546/37 |
| 4,217,455 | A | * | 8/1980  | Hoch et al. ................ 546/37 |
| 4,286,094 | A | * | 8/1981  | Hoch et al. ................ 546/37 |
| 4,298,534 | A | * | 11/1981 | Hoch et al. ................ 552/281 |
| 4,332,955 | A | * | 6/1982  | Hoch et al. ................ 549/56 |
| 4,705,572 | A |   | 11/1987 | Spietschka et al. |
| 4,742,170 | A |   | 5/1988  | Spietschka et al. |
| 5,062,577 | A |   | 11/1991 | Schmitt et al. |
| 5,071,482 | A | * | 12/1991 | Dietz et al. ................ 106/498 |
| 5,264,032 | A | * | 11/1993 | Dietz et al. ................ 106/411 |
| 5,614,015 | A |   | 3/1997  | Urban et al. |
| 5,626,662 | A |   | 5/1997  | Urban et al. |
| 5,662,739 | A | * | 9/1997  | Urban et al. ................ 106/497 |
| 6,174,361 | B1 |   | 1/2001 | Urban et al. |
| 6,521,756 | B1 |   | 2/2003 | Weber et al. |
| 6,646,126 | B1 |   | 11/2003 | Weber et al. |
| 2001/0016656 | A1 | * | 8/2001 | Weber et al. ................ 546/37 |

FOREIGN PATENT DOCUMENTS

| DE | 1067157  | 4/1960 |
| DE | 1113773  | 3/1962 |
| DE | 2803362  | 10/1978 |
| DE | 2727484  | 1/1979 |
| DE | 2854190  | 3/1980 |
| DE | 3716587  | 2/1993 |
| DE | 10005186 | 8/2001 |
| EP | 0176899  | 4/1986 |
| EP | 0213281  | 3/1987 |
| EP | 0678559  | 10/1995 |
| EP | 0702060  | 3/1996 |
| EP | 0979846  | 2/2000 |
| EP | 1130062  | 9/2001 |

OTHER PUBLICATIONS

Copy of Search Report for PCT/EP 03/02730, mailed Jul. 16, 2003.
English Translation of IPER for PCT/EP 03/02730, Jan. 27, 2005.

* cited by examiner

Primary Examiner—Anthony J. Green
(74) Attorney, Agent, or Firm—Anthony A. Bisulca

(57) ABSTRACT

The invention relates to a method for producing vattable organic pigments. The invention is characterized in that an agueous or an aqueous-organic suspension of a coarse crystalline raw mineral is vatted and re-oxidised, and the pigment suspension is ground to a diameter equal to or less than 0.9 mm during vatting and/or during oxidation by means of an agitator ball mill, which is operated at a power density of more than 1.0 KW per litre per grinding chamber and at an agitator peripheral speed of more than 12 m/s, using grinding bodies.

11 Claims, No Drawings

METHOD FOR PRODUCING VATTABLE ORGANIC PIGMENTS

The present invention relates to a new method of fine division of organic pigments.

Many organic pigments are obtained from their synthesis in the form of coarsely crystalline crude pigments. In order to bring them into a form in which they can be used practically, it is necessary to reduce the particles in size. A variety of methods are known for this purpose in the literature.

DE-2 727 484 discloses a method of fine division of perylene-3,4,9,10-tetracarboxylic acid N,N'-bismethyl imide by revatting.

DE-2 803 362 discloses a method for fine division especially for the two pigments perylene-3,4,9,10-tetracarboxylic bis-p-phenetidide and bis-p-chloroanilide by oxidizing the leuco form in the presence of surfactants or exposure to shearing forces. Shearing forces are produced by dispersing mills customary at that time.

DE-2 854190 discloses a method through oxidation of the leuco compound of indanthrone pigments with simultaneous exposure to shearing forces. The presence of surfactants is required. The shearing forces are produced by dispersing mills customary at that time.

In EP-176 899 the fine division method employed is a customary salt vibration milling. The large amounts of salts used burden the wastewater.

EP-213 281 describes a method of fine division of pigments of the anthanthrone series by revatting with a subsequent solvent finish. This is a two-stage method for one individual pigment class. The use of a solvent necessitates technically demanding apparatus for solvent recovery.

EP-678 559 discloses a fine division method for organic pigments where the pigments are first subjected to dry milling and the resulting prepigments are wet-milled in aqueous suspension in a stirred ball mill with a high power density. The two-stage method requires long operating times. Dry milling is associated with considerable production of dust, which is problematic from the standpoint of occupational hygiene.

EP-702 060 discloses a method of producing 4,10-dibromoanthanthrone pigments using a stirred ball mill with high power density.

EP-979 846 discloses a method of producing N,N'-dimethylperylene-3,4,9,10-tetracarboxylic diimide using a stirred ball mill with high power density and employing one or more additives from the group of the pigment dispersants and surfactants.

DE-100 05 186 discloses a method of producing perylene-3,4,9,10-tetracarboxylic diimide using a stirred ball mill with high power density.

The use of pigments for coloring high molecular mass organic materials imposes exacting requirements on the performance properties of the pigments, such as high color strength, excellent overcoating fastnesses in the case of using coating systems, high gloss, low viscosity of the highly pigmented paint concentrates (milbase) and, particularly in the case of metallic finishes, high transparency and brilliant colors. They should also be able to be used as far as possible universally in the different varnish systems. In the case of coloring of plastics there is a demand, in addition to the coloristics and the fastness properties such as bleedfastness, for ready dispersibility in particular.

The methods disclosed in the publications referred to above are in some cases intended only for specific pigments and in some cases associated with drawbacks such as multiple stages, long operating times, use of solvent or large quantities of salt, which is reflected in increased costs.

There was a need for improvement and hence the object of finding a method of fine division of vattable organic pigments which is an improvement on the prior art, being more cost-effective, whose use is not restricted to a specific pigment, and which provides pigments which satisfy the requirements in terms of performance properties.

It has been found that the object is achieved surprisingly through combination of vatting with wet milling with a stirred ball mill of high energy density.

The invention provides a method of producing vattable organic pigments which comprises vatting an aqueous or aqueous-organic suspension of a coarsely crystalline crude pigment and reoxidizing it, the pigment suspension being milled during vatting and/or oxidation by means of a stirred ball mill which is operated with a power density of more than 1.0 kW, in particular more than 1.5 kW, per liter of milling space and with a peripheral stirrer speed of more than 12 m/s, under the action of grinding media with a diameter of less than or equal to 0.9 mm.

By vatting is normally meant a reduction of the colorant, the color of the reduced colorant generally being different from that of the unreduced original colorant.

The method of the invention relates to all organic pigments which can be vatted, examples being indanthrones, such as C.I. Pigment Blue 60; anthanthrones, such as C.I. Pigment Red 168; thioindigo, such as C.I. Pigment Red 88,181, C.I. Vat Red 41 and C.I. Pigment Blue 66; perinones, such as C.I. Pigment Orange 43, C.I. Pigment Red 194 and C.I. Vat Red 14; or perylenes, such as C.I. Pigment Red 123, 149, 178, 179 and 189, C.I. Pigment Violet 29 and C.I. Pigment Black 31 and 32, and also mixtures or mixed crystals thereof.

The coarsely crystalline crude pigments are vatted in aqueous-alkaline suspension with a reducing agent, such as alkali metal hydrogensulfite, alkali metal dithionite, alkali metal hydroxymethanesulfinate or borohydrides. Preference is given to sodium or potassium dithionite.

The optimum pigment concentration in the suspension is dependent on the particle size and particle morphology of the pigment and also on the rheology of the suspension. It can be from 2.5% to 40% by weight, preferably from 5% to 25% by weight, in particular from 7.5% to 20% by weight, based on the overall weight of the suspension.

The amount of reducing agent can be up to five times the amount require stoichiometrically for vatting, though it is preferred to use only from 0.1 to 2 times the required amount.

The aqueous-alkali medium is prepared using preferably aqueous solutions of alkali metal hydroxides, preferably sodium and potassium hydroxide solution.

The alkali should be used stoichiometrically to the amount of reducing agent, although it is also possible to use an excess of up to 5 times in respect of the reducing agent.

Reoxidation is carried out using an oxidizing agent in an amount which is at least stoichiometric relative to reducing agent; it may be up to 5 times the stoichiometric amount. Oxidizing agents used are, for example, hydrogen peroxide and adducts thereof, such as sodium perborate; air; oxidizing salts, such as nitrates, chlorates or hypochlorites, especially alkaline hypochlorite solution; oxidizing acids, such as nitric acid; or nitro compounds, such as 3-nitrobenzenesulfonic acid.

Milling takes place at any desired point in time, with the proviso that it relates to a time period between the beginning of reduction and the end of oxidation. Thus, for example, the reducing agent can be added while milling is ongoing, or milling may follow the reduction. Milling can also take place during the addition of the oxidizing agent and if appropriate may continue following complete oxidation until the desired fineness is reached, or milling operates both during reduction and during oxidation. The leuco compound can be milled in the form of its salt and in the form of its acid, which can be deposited after reduction by addition of organic or inorganic acids. Acids suitable for depositing the leuco form include organic acids, such as aliphatic or aromatic carboxylic or sulfonic acids, such as formic acid, acetic acid, trichloroacetic acid, propionic acid, butyric acid, hexanoic acid, oxalic acid, citric acid, benzoic acid, phenylacetic acid, benzenesulfonic acid or p-toluenesulfonic acid, and inorganic acids, such as hydrochloric acid, sulfuric acid or phosphoric acid, for example.

Examples of mills suitable for the milling carried out in the method of the invention are stirred ball mills which are designed for batchwise and continuous operation, which have a cylindrical or hollow-cylindrical milling chamber in horizontal or vertical construction, and which can be operated with a specific power density of more than 1.0 kW, in particular more than 1.5 kW, per liter of milling space, and whose peripheral stirrer speed is more than 12 m/s. Mills suitable for this purpose are described for example in DE-C-3 716 587. If the milling intensity of the mill is lower, then the good properties according to the invention, in particular the outstanding coloristics, such as high transparency and color strength, and the ready dispersibility of the pigments are not achieved. The energy output per unit time by the stirrer is transmitted to the milbase as disruption energy and as frictional energy in the form of heat. In order safely to remove this large quantity of heat it is necessary to take constructional measures to keep the ratio of milling space to milling-chamber surface area (cooling area) as low as possible. At high throughputs, milling is carried out in circulation and the heat is dissipated to the outside predominantly via the milbase. Grinding media used include beads of zirconium oxide, zirconium mixed oxide, aluminum oxide or quartz with a diameter of less than or equal to 0.9 mm; it is advantageous to use those having a diameter of from 0.2 to 0.9 mm, preferably from 0.3 to 0.5 mm. When continuous stirred ball mills are used for the fine division the grinding media are separated from the milbase preferably by centrifugal deposition, so that there is virtually no contact between the separation devices and the grinding media, thus making it possible to a large extent to prevent the separation devices becoming blocked. In this case the stirred ball mills are operated with a high grinding media charge. In the case of the continuous stirred ball mills the milling chamber is filled almost completely with grinding media.

The milling duration is dependent on the fineness requirements and on the requirements regarding the performance properties for the particular field of use. Accordingly the residence time of the milbase in the stirred ball mill is generally between 3 and 60 minutes. It normally runs to a duration of 4 and 45 minutes, preferably from 5 to 30 minutes.

Milling, vatting and reoxidation are advantageously conducted at temperatures in the range from 0 to 100° C., advantageously at a temperature between 10 and 60° C., preferably at from 20 to 50° C.

The liquid medium in the method of the invention is advantageously water. However, it is also possible to use an aqueous-organic medium. Suitable organic solvents include alcohols having 1 to 10 carbon atoms, such as methanol, ethanol, n-propanol, isopropanol, butanols, such as n-butanol, isobutanol and tert-butanol, pentanols, such as n-pentanol and 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, cyclohexanol; or glycols, such as ethylene glycol, diethylene glycol, propylene glycol, dipropylene glycol, or glycerol; polyglycols, such as polyethylene or polypropylene glycols; ethers, such as methyl isobutyl ether, tetrahydrofuran, dimethoxyethane or dioxane; glycol ethers, such as monomethyl or monoethyl ethers of ethylene or propylene glycol, diethylene glycol monomethyl ether, diethylene glycol monoethyl ether, butyl glycols or methoxybutanol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$–$C_6$ alkyl esters, such as butyl formate, ethyl acetate or propyl propionate; or carboxylic acid $C_1$–$C_6$ glycol esters; or glycol ether acetates, such as 1-methoxy-2-propyl acetate; or phthalic or benzoic acid $C_1$–$C_6$ alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halogen-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as morpholine, picoline or quinoline; and also hexamethylphosphoramide, 1,3-dimethyl-2-imidazolidinone, dimethyl sulfoxide and sulfolane. Particular preference is given to water and mixtures of $C_1$–$C_6$ alcohols, N-methylpyrrolidone, nitrobenzene and/or toluene with water. When selecting the solvents it is important to ensure that they are stable under the chosen conditions.

Following complete oxidation and the end of milling the pigments are isolated in customary fashion by filtration. Prior to isolation of a pigment it is possible for any solvent used to be removed by distillation, where appropriate under reduced pressure, or else by steam distillation.

The pigments produced by the method of the invention can be employed as preferably aqueous presscakes, but in general are solid systems of free-flowing powder kind, or granules.

The coloristic properties can be enhanced, and certain performance effects obtained, by using auxiliaries such as, for example, surfactants, pigmentary and nonpigmentary dispersants, fillers, standardizers, resins, waxes, defoamers, antidust agents, extenders, shading colorants, preservatives, drying retardants, rheology control additives, wetting agents, antioxidants, UV absorbers, light stabilizers, or a combination thereof. Auxiliaries can be added at any desired point in time before, during or after the reduction, oxidation or isolation, all at once or in two or more portions. The total amount of auxiliaries added can amount to from 0% to 40% by weight, preferably from 1 % to 30% by weight, more preferably from 2.5% to 25% by weight, based on the pigment.

Suitable surfactants include anionic or anion-active, cationic or cation-active and nonionic substances, or mixtures of these agents. Preference is given to those surfactants or surfactant mixtures which do not foam in the course of milling, reduction and oxidation. Examples of suitable anionic substances include fatty acid taurides, fatty acid N-methyltaurides, fatty acid isethionates, alkylphenylsulfonates, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; soaps, examples being alkali metal salts of fatty acids, naphthenic acids and resin acids, such as abietic acid, alkali-soluble resins, examples being rosin-modified maleate resins and condensation products based on cyanuric chloride, taurine, N,N'-diethylaminopropylamine and p-phenylenediamine. Particular preference is given to resin soaps, i.e., alkali metal salts of resin acids. Examples of suitable cationic substances include quaternary ammonium salts, fatty amine alkoxylates, alkoxylated polyamines, fatty amine polyglycol ethers, fatty amines, diamines and polyamines derived from fatty amines or fatty alcohols, and the alkoxylates of said amines, imidazolines derived from fatty acids, and salts of these cationic substances, such as acetates, for example. Examples of suitable nonionic substances include amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers.

By nonpigmentary dispersants are meant substances which in structural terms are not derived from organic pigments. They are added as dispersants either during the actual preparation of pigments or else in many cases during the incorporation of the pigments into the application media to be colored: for example, during the preparation of paints or printing inks by dispersing of the pigments into the corresponding binders. They may be polymeric substances, such as polyolefins, polyesters, polyethers, polyamides, polyimines, polyacrylates, polyisocyanates, block copolymers thereof, copolymers of the corresponding monomers or polymers of one class modified with a few monomers with a different class. These polymeric substances carry polar anchor groups such as hydroxyl, amino, imino and ammonium groups, carboxylic acid and carboxylate groups, sulfonic acid and sulfonate groups or phosphonic acid and phosphonate groups, and can also be modified with aromatic non-pigmentary substances. Nonpigmentary dispersants may additionally be aromatic substances modified chemically with functional groups but not derived from organic pigments. Nonpigmentary dispersants of this kind are known to the skilled worker and in some cases are available commercially (e.g., Solsperse®, Avecia; Disperbyk®, Byk, Efka®, Efka). A number of types will be mentioned below as representatives; however, it is possible in principle to use any desired other substances described, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxyl compounds, polyesteramides, modified polyamides, modified acrylic polymers, dispersants with comblike structure formed from polyesters and acrylic polymers, phosphoric esters, polymers derived from triazine, modified polyethers, or dispersants derived from aromatic, non-pigmentary substances. These base structures are in many cases modified further, by means for example of chemical reaction with further substances which carry functional groups, or by formation of salts.

By pigmentary dispersants are meant pigment dispersants which derive from an organic pigment base structure and are prepared by chemical modification of said base structure; examples include pigment dispersants containing saccharin, piperidyl-containing pigment dispersants, naphthalene- or perylene-derived pigment dispersants, pigment, dispersants containing functional groups linked to the pigment base structure via a methylene group, pigment base structures modified chemically with polymers, pigment dispersants containing sulfo acid groups, sulfonamide groups or sulfo acid ester groups, pigment dispersants containing ether or thioether groups, or pigment dispersants containing carboxylic acid, carboxylic ester or carboxamide groups.

It is also possible to follow milling by a finish treatment, where appropriate using organic solvents, at elevated temperature.

It was surprising that the inventive combination of vatting and milling is accompanied, for a given milling duration, by attainment of significantly greater effects, such as high transparency, for example. As a result it is also possible to reduce the milling duration. For the preparation of the pigments the use of solvents or auxiliaries is not mandatory in the method of the invention. The amount of salt produced can be significantly reduced in comparison with the prior art.

The pigments of the invention, when used for coloring high molecular mass organic materials, are distinguished by outstanding performance properties, in particular by outstanding rheology, ready dispersibility, high transparency, good gloss behavior, high color strength, excellent bleedfastnesses and overcoating fastnesses, and very good lightfastness and weatherfastness.

The pigments produced by the method of the invention can be employed for pigmenting high molecular mass organic materials of natural or synthetic origin, such as plastics, resins, varnishes, paints or electrophotographic toners and developers, and also drawing, writing and printing inks.

Examples of high molecular mass organic materials that can be pigmented with said pigments are cellulose ethers and cellulose esters, such as ethylcellulose, nitrocellulose, cellulose acetate or cellulose butyrate, natural resins or synthetic resins, such as addition-polymerization resins or condensation resins, examples being amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, caseine, silicone and silicone resins, individually or in mixtures. It is irrelevant whether the aforementioned high molecular mass organic compounds are in the form of plastic masses, melts or in the form of spinning solutions, varnishes, paints or printing inks. Depending on the intended use it is found advantageous to utilize the pigments obtained in accordance with the invention in the form of a blend or in the form of preparations or dispersions. Based on the high molecular mass organic material to be pigmented, the pigments of the invention are used in an amount of from 0.05% to 30% by weight, preferably from 0.1% to 15% by weight.

The pigments produced in accordance with the invention are also suitable as colorants in electrophotographic toners and developers, such as one-component or two-component powder toners (also called one-component or two-component developers), magnetic toners, liquid toners, polymerization toners and specialty toners, for example.

Typical toner binders are addition-polymerization resins, polyaddition resins and polycondensation resins, such as styrene, styrene-acrylate, styrene-butadiene, acrylate, polyester and phenol-epoxy resins, polysulfones, polyurethanes, individually or in combination, and also polyethylene and polypropylene, which may also already include, or be modified subsequently with, further ingredient additions, such as charge control agents, waxes or flow assistants.

The pigments produced in accordance with the invention are further suited to use as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

Resins used as powder coating resins are typically epoxy resins, carboxyl- and hydroxyl-containing polyester resins, polyurethane resins and acrylic resins, together with customary curatives. Resin combinations also find use. Thus, for example, epoxy resins are frequently employed in combination with carboxyl- and hydroxyl-containing polyester resins. Typical curative components (depending on the resin system) are, for example, acid anhydrides, imidazoles and also dicyandiamide and its derivatives, blocked isocyanates, bisacylurethanes, phenolic and melamine resins, triglycidyl isocyanurates, oxazolines and dicarboxylic acids.

The pigments produced in accordance with the invention are also suitable for use as colorants in ink-jet inks, on both an aqueous and a nonaqueous basis, and also in those inks which operate in accordance with the hot-melt process.

Additionally the pigments produced in accordance with the invention are also suitable for use as colorants for color filters, and also for both additive and subtractive color generation.

To assess the properties of the pigments in the plastics field, a selection was made, from among the multiplicity of known plastics, of plasticized polyvinyl chloride (PVC). The bleedfastness was determined in accordance with DIN 53775.

To assess the properties of the pigments in the coatings sector, a selection was made, from among the multiplicity of known varnishes, of an alkyd-melamine resin varnish based on a medium-oil alkyd resin and on a butanol-etherified melamine resin (AM) and also of a high-solids acrylic resin stoving varnish based on a nonaqueous dispersion (HS).

The color strength and shade were determined in accordance with DIN 55986.

The millbase rheology after dispersion was evaluated visually on the basis of the following five-point scale:

5 highly fluid
4 liquid
3 viscous
2 slightly set
1 set

The fastness to overcoating was determined in accordance with DIN 53221.

The determination of the viscosity was made after dilution of the millbase to the final pigment concentration, using the Rossmann viscospatula type 301 from Erichsen.

In the examples below parts and percentages are by weight in each case.

EXAMPLE 1

10 parts of crude perylenetetracarboxylic bis-p-phenetidide (P.R.123, C.I. No. 71145), prepared according to DE-1 113 773 example 1, are suspended in 74 parts of water. Following addition of 8 parts of 100% sodium hydroxide, 8 parts of 100% sodium dithionite and 360 parts of zirconium mixed oxide beads of diameter 0.3–0.4 mm as grinding media, the suspension is charged to a stirred ball mill (manufacturer: Draiswerke GmbH, Mannheim) and milled for 10 minutes at 20° C. with a peripheral speed of 15.7 m/s and a power density of 3.1 kW/l milling space. Thereafter the grinding media are separated from the millbase by sieving. The suspension is heated to 60° C. It is admixed with 28.6 parts of Perhydrol in 35% form, heated to 80° C. and stirred at 80° C. for 2 h. Then it is filtered with suction and the solid product is washed with water and dried at 80° C. This gives about 9 parts of pigment, which in plastic (PVC) yields strong, transparent colorations of good dispersibility (no bits) and excellent bleedfastness.

EXAMPLE 2

The procedure of example 1 is repeated with the sole difference that instead of the 28.6 parts of Perhydrol 90 parts of Perhydrol in 35% form are used. This gives about 9 parts of pigment, which in plastic (PVC) yields strong, transparent colorations of good dispersibility (no bits) and excellent bleedfastness.

EXAMPLE 3a

COMPARATIVE EXAMPLE (DRY MILLING WITH SALT, NO VATTING)

A plastic container filled to 80% by volume with 1400 parts of steatite cylinders 12 mm in diameter and 12 mm in length as grinding media, is charged with 30 parts of crude perylenetetracarboxylic bis-p-phenetidide, prepared according to DE-1 113 773 example 1, and 90 parts of sodium sulfate. Milling to a fine degree takes place for 8 hours with shaking on a vibratory mill (Vibratom type; manufacturer: Siebtechnik Mühlheim) at 1400 revolutions per minute, vibration circle 4 mm. The millbase is separated from the grinding media by sieving and introduced into 2000 parts of water. 33% strength sodium hydroxide solution is used to set a pH of 11.5, after which the aqueous millbase is stirred at 80° C. for 2 hours and filtered with suction and the solid product is washed free of salt and dried at 80° C. This gives 25.6 parts of pigment. The colorations in plastic (PVC), compared with those of example 2, are much more opaque and substantially darker.

EXAMPLE 3b

COMPARATIVE EXAMPLE (INVENTIVE MILLING, NO VATTING)

10 parts of crude perylenetetracarboxylic bis-p-phenetidide (P.R.123, C.I. No. 71145), prepared according to DE-1 113 773 example 1, are suspended in 96 parts of water. Following addition of 4 parts of 100% sodium hydroxide and 360 parts of zirconium mixed oxide beads of diameter 0.3–0.4 mm as grinding media, the suspension is charged to a stirred ball mill (manufacturer: Draiswerke GmbH, Mannheim) and milled for 10 minutes at 20° C. with a peripheral speed of 15.7 m/s and a power density of 3.1 kW/l milling space. Thereafter the grinding media are separated from the millbase by sieving. The suspension is filtered with suction and the pigment is washed with water and dried at 80° C. This gives about 9.5 parts of pigment, which in plastic (PVC), compared to the colorations from example 1, yields colorations which are substantially more opaque, darker and bluer.

EXAMPLE 4

10 parts of coarsely crystalline crude 4,10-dibromoanthanthrone pigment (P.R.168, C.I. No. 59300), prepared according to Fiat Final Report 1313 Vol. II, are suspended in 90 parts of water. Following addition of 8 parts of 100% sodium hydroxide, 9.3 parts of 86% sodium dithionite and 360 parts of zirconium mixed oxide beads of diameter 0.3–0.4 mm as grinding media, the suspension is charged to a stirred ball mill (manufacturer: Draiswerke GmbH, Mannheim) and milled for 10 minutes at 20° C. with a peripheral speed of 15.7 m/s and a power density of 3.1 kW/l milling space. Thereafter the grinding media are separated from the millbase by sieving. 90.8 parts of Perhydrol in 35% form are admixed to the suspension and the mixture is stirred for 1 h. Then it is filtered with suction and the solid product is washed with water and dried at 80° C. This gives 6.1 parts of pigment, which in the AM varnish yields strongly colored, transparent coatings with a yellowish red shade. The gloss measurement produces a value of 77 and the viscosity is 5.1 s.

EXAMPLE 5

COMPARATIVE EXAMPLE (INVENTIVE MILLING, NO VATTING)

The procedure described in example 4 is repeated with the difference that no sodium dithionite is added; instead, a pH of 12 is set using 33% strength sodium hydroxide. This gives 9.3 parts of pigment, which in the AM varnish, as compared with the pigment prepared according to example 4, yields coatings which are significantly more opaque and much bluer; the gloss measurement gives a lower value of 54, and the viscosity is higher and is 6.6 s.

EXAMPLE 6a

COMPARATIVE EXAMPLE (INVENTIVE MILLING, NO VATTING)

10 parts of commercially customary, coarsely crystalline crude indanthrone pigment (P.B. 60, C.I. No. 69800, prepared for example according to BIOS 987, 4, 52/4; FIAT 1313, 2, 73) are suspended in 90 parts of water. A pH of 12 is set using 33% strength sodium hydroxide solution. Following addition of 360 parts of zirconium mixed oxide beads of diameter 0.3–0.4 mm as grinding media the suspension is charged to a stirred ball mill (manufacturer: Draiswerke GmbH, Mannheim) and is milled at 20° C. for 10 minutes with a peripheral speed of 15.7 m/s and a power density of 3.1 kW/l milling space. Thereafter the grinding media are separated from the millbase by sieving and the pigment is filtered off with suction, washed with water and dried at 80° C. This gives 9.2 parts of pigment.

EXAMPLE 6b 10 parts of the crude indanthrone pigment likewise used in example 6a are suspended in 74 parts of water. Following the addition of 8 parts of 100% sodium hydroxide, 9.3 parts of 86% sodium dithionite and 360 parts of zirconium mixed oxide beads of diameter 0.3–0.4 mm as grinding media the suspension is charged to a stirred ball mill (manufacturer: Draiswerke GmbH, Mannheim) and is milled at 20° C. for 10 minutes with a peripheral speed of 15.7 m/s and a power density of 3.1 kW/l milling space. Thereafter the grinding media are separated from the millbase by sieving. Then at room temperature 90 parts of Perhydrol in 35% form are added and the mixture is stirred for 1 h. It is then filtered with suction and the solid product is washed with water and dried at 80° C. This gives 9 parts of pigment, which in the HS varnish yields strongly colored, transparent coatings with a reddish shade. The metallic coating is brilliant and reddish. Compared with the coating made using the pigment prepared according to example 6a, the masstone coating is significantly more transparent, the white reduction is significantly stronger in color and much more reddish, and the metallic coating is likewise much more reddish.

EXAMPLE 7

10 parts of a coarsely crystalline crude perylene pigment P.R.149, C.I. No. 71137, prepared according to DE-1 067 157, are suspended in 74 parts of 20% strength aqueous tert-amyl alcohol. Following addition of 8 parts of 100% sodium hydroxide, 9.3 parts of 86% sodium dithionite and 360 parts of zirconium mixed oxide beads of diameter 0.3–0.4 mm as grinding media, the suspension is charged to a stirred ball mill (manufacturer: Draiswerke GmbH, Mannheim) and milled for 30 minutes at 20° C. with a peripheral speed of 15.7 m/s and a power density of 3.1 kW/l milling space. Thereafter the grinding media are separated from the millbase by sieving. The suspension is heated to 60° C., admixed with 90 parts of Perhydrol in 35% form, heated to 80° C. and stirred at 80° C. for 2 h. The amyl alcohol is removed by steam distillation and the pigment is filtered off with suction, washed with water and dried at 80° C. This gives about 9 parts of pigment, which in plastic (PVC) yields strong, transparent colorations of good dispersibility (no bits) and excellent bleedfastness.

What is claimed is:

1. A method of producing a vattable organic pigment comprising the steps of vatting an aqueous or aqueous-organic suspension of a coarsely crystalline crude pigment and oxidizing the aqueous or aqueous-organic suspension of a coarsely crystalline crude pigment, wherein at least one of the steps of vatting and oxidizing further comprises milling the aqueous or aqueous-organic suspension of a coarsely crystalline crude pigment with a stirred ball mill operated with a power density of more than 1.0 kW per liter of milling space and with a peripheral stirrer speed of more than 12 m/s, under the action of grinding media with a diameter of less than or equal to 0.9 mm.

2. The method as claimed in claim 1, wherein the coarsely crystalline pigment is selected from the group consisting of indanthrone, anthanthrone, thioindigo, perinone and perylene pigments.

3. The method as claimed in claim 1, wherein the coarsely crystalline pigment is C.I. Pigment Blue 60, 66, C.I. Pigment Red 88, 168, 123, 149, 178, 179, 181, 189, 194, C.I. Vat Red 14, 41, C.I. Pigment Orange 43, C.I. Pigment Violet 29, C.I. Pigment Black 31 or 32, a mixture thereof or a mixed crystal thereof.

4. The method as claimed in claim 1, wherein the vatting step occurs with sodium dithionite or potassium dithionite.

5. The method as claimed in claim 1, wherein the pigment concentration in the suspension is from 2.5% to 40% by weight, based on the total weight of the suspension.

6. The method as claimed in claim 1, wherein the milling duration is between 3 and 60 minutes.

7. The method as claimed in claim 1, wherein vatting, oxidation and milling are conducted at a temperature between 0 and 100° C.

8. The method as claimed in claim 1, wherein the suspension comprises water or a mixture of $C_1$–$C_6$ alcohols, N-methylpyrrolidone, toluene and/or nitrobenzene with water.

9. The method as claimed in at claim 1, wherein at least one of the vatting and oxidizing steps further comprises adding at least one auxiliary selected from the group consisting of surfactants, pigmentary and nonpigmentary dispersants, fillers, standardizers, resins, waxes, defoamers, antidust agents, extenders, shading colorants, preservatives, drying retardants, rheology control additives, wetting agents, antioxidants, UV absorbers, light stabilizers and a combination thereof.

10. The method as claimed in claim 1, wherein milling occurs during at least the vatting step and wherein the compound formed during the vatting step is milled in the form of its salt or in the form of its acid.

11. A method of producing a vattable organic pigment comprising the steps of vatting an aqueous or aqueous-organic suspension of a coarsely crystalline crude pigment and oxidizing the aqueous or aqueous-organic suspension of a coarsely crystalline crude pigment, wherein the steps of vatting and oxidizing further comprises milling the aqueous or aqueous-organic suspension of a coarsely crystalline crude pigment with a stirred ball mill operated with a power density of more than 1.0 kW per liter of milling space and with a peripheral stirrer speed of more than 12 m/s, under the action of grinding media with a diameter of less than or equal to 0.9 mm.

* * * * *